(12) United States Patent
Ohsawa et al.

(10) Patent No.: US 11,133,525 B2
(45) Date of Patent: Sep. 28, 2021

(54) LITHIUM-ION SECONDARY BATTERY AND METHOD OF PRODUCING THE SAME

(71) Applicant: TOYOTA JIDOSHA KABUSHIKI KAISHA, Toyota (JP)

(72) Inventors: Ryosuke Ohsawa, Okazaki (JP); Keisuke Ohara, Osaka (JP); Akihiro Taniguchi, Ashiya (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/377,763

(22) Filed: Apr. 8, 2019

(65) Prior Publication Data

US 2019/0312302 A1 Oct. 10, 2019

(30) Foreign Application Priority Data

Apr. 9, 2018 (JP) .............................. JP2018-074464

(51) Int. Cl.

| | |
|---|---|
| *H01M 4/48* | (2010.01) |
| *H01M 4/131* | (2010.01) |
| *H01M 4/1391* | (2010.01) |
| *H01M 10/0525* | (2010.01) |
| *H01M 10/0568* | (2010.01) |
| *H01M 10/058* | (2010.01) |
| *H01M 4/02* | (2006.01) |

(52) U.S. Cl.
CPC ....... *H01M 10/0525* (2013.01); *H01M 4/131* (2013.01); *H01M 4/1391* (2013.01); *H01M 4/48* (2013.01); *H01M 10/058* (2013.01); *H01M 10/0568* (2013.01); *H01M 2004/027* (2013.01)

(58) Field of Classification Search
CPC ...... H01M 4/48; H01M 4/131; H01M 4/1391; H01M 10/0525; H01M 10/0568
See application file for complete search history.

(56) References Cited

U.S. PATENT DOCUMENTS

| | | |
|---|---|---|
| 6,383,686 B1 | 5/2002 | Umeno et al. |
| 2004/0106040 A1 | 6/2004 | Fukuoka et al. |
| 2008/0145758 A1* | 6/2008 | Kim ................ H01M 10/0525 429/219 |
| 2011/0171502 A1* | 7/2011 | Kottenstette .......... H01M 4/525 429/49 |

(Continued)

FOREIGN PATENT DOCUMENTS

| | | |
|---|---|---|
| JP | 2000-021449 A | 1/2000 |
| JP | 2000-215887 A | 8/2000 |

(Continued)

*Primary Examiner* — Kenneth J Douyette
(74) *Attorney, Agent, or Firm* — Sughrue Mion, PLLC (57) ABSTRACT

A lithium-ion secondary battery includes at least a negative electrode, a positive electrode, and an electrolyte solution. The negative electrode includes at least negative electrode active material particles. Each of the negative electrode active material particles contains at least a $SiO_x$ particle and a Si layer. The Si layer covers a surface of the $SiO_x$ particle. The Si layer has a thickness not smaller than 10 nm and not greater than 100 nm. The electrolyte solution contains at least one selected from the group consisting of FEC and VC.

14 Claims, 2 Drawing Sheets

(56) References Cited

U.S. PATENT DOCUMENTS

| | | | | |
|---|---|---|---|---|
| 2013/0136988 A1* | 5/2013 | Tanaka | ................... | H01M 4/525 |
| | | | | 429/220 |
| 2015/0028263 A1* | 1/2015 | Wang | ................... | H01M 4/386 |
| | | | | 252/502 |
| 2016/0276708 A1 | 9/2016 | Kawasoe et al. | | |

FOREIGN PATENT DOCUMENTS

| | | | |
|---|---|---|---|
| JP | 2004-178917 A | 6/2004 | |
| JP | 2016-173886 A | 9/2016 | |

* cited by examiner

LITHIUM-ION SECONDARY BATTERY AND METHOD OF PRODUCING THE SAME

This nonprovisional application claims priority to Japanese Patent Application No. 2018-074464 filed on Apr. 9, 2018, with the Japan Patent Office, the entire contents of which are hereby incorporated by reference.

BACKGROUND

Field

The present disclosure relates to a lithium-ion secondary battery and a method of producing the same.

Description of the Background Art

Japanese Patent Laying-Open No. 2016-173886 discloses an electrolyte solution that contains fluoroethylene carbonate. It also discloses a negative electrode that may include silicon oxide particles as a negative electrode active material.

SUMMARY

As a candidate for a negative electrode active material of a lithium-ion secondary battery (which may be simply referred to as "battery" herein), silicon oxide ($SiO_x$) particles have been researched. $SiO_x$ particles may have a high specific capacity. A battery containing $SiO_x$ particles is expected to have a high capacity. When $SiO_x$ particles are contained, however, cycle capacity retention tends to be low.

It is known that when fluoroethylene carbonate (FEC) and vinylene carbonate (VC) are contained in the electrolyte solution, cycle capacity retention improves. Using FEC and/or the like, however, tends to cause a decrease in post-high-temperature-storage capacity retention.

An object of the present disclosure is to mitigate a decrease in post-high-temperature-storage capacity retention of a lithium-ion secondary battery that includes $SiO_x$ particles as a negative electrode active material and also includes FEC and/or the like in the electrolyte solution.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A lithium-ion secondary battery according to the present disclosure includes at least a negative electrode, a positive electrode, and an electrolyte solution. The negative electrode includes at least negative electrode active material particles. Each of the negative electrode active material particles contains at least a silicon oxide particle and a silicon layer. The silicon layer covers a surface of the silicon oxide particle. The silicon layer has a thickness not smaller than 10 nm and not greater than 100 nm. The electrolyte solution contains at least one selected from the group consisting of fluoroethylene carbonate and vinylene carbonate.

Herein, "at least one selected from the group consisting of FEC and VC" may be simply referred to as "FEC and/or the like". In the configuration in which FEC and/or the like is contained in the electrolyte solution, post-high-temperature-storage capacity retention may be decreased due to the mechanism described below.

During initial charge of the battery, lithium orthosilicate ($Li_4SiO_4$) may be produced within the silicon oxide ($SiO_x$) particles (by a reaction represented by a reaction formula (I) below). $Li_4SiO_4$ may be a cause of irreversible capacity loss.

$$4SiO+16Li \rightarrow 3Li_4Si+Li_4SiO_4 \qquad (I)$$

FEC and/or the like contained in the electrolyte solution may break down on surfaces of the $SiO_x$ particles. As a result of the breakdown of FEC and/or the like, a film may be formed. The film is also called solid electrolyte interface (SEI) film. During charge-discharge cycles, the film may mitigate side reaction between the $SiO_x$ particles and the electrolyte solution. As a result, cycle capacity retention may improve.

FEC and/or the like is a carbonic acid ester. As a result of the breakdown of FEC and/or the like, carbon dioxide ($CO_2$) may be produced as well. When $CO_2$ comes into contact with $Li_4SiO_4$, lithium carbonate ($Li_2CO_3$) and lithium meta-silicate ($Li_2SiO_3$) may be produced (by a reaction represented by a reaction formula (II) below).

$$Li_4SiO_4+CO_2 \rightarrow Li_2CO_3+Li_2SiO_3 \qquad (II)$$

$Li_2SiO_3$ may react with Li, as represented by a reaction formula (LI) below. As a result, $Li_4SiO_4$ may be produced again.

$$Li_2SiO_3+Li \rightarrow 0.75Li_4SiO_4+0.25Si \qquad (III)$$

$Li_4SiO_4$ produced by the reaction represented by the reaction formula (III) may come into contact with $CO_2$. As a result, the reaction represented by the formula (II) may take place again to produce $Li_2CO_3$ and $Li_2SiO_3$. During storage at a high temperature, the reactions represented by the reaction formulae (II) and (III) may take place repeatedly to consume Li (Li may contribute to charge and discharge). As a result, post-high-temperature-storage capacity retention may decrease.

Within the battery according to the present disclosure, a surface of the $SiO_x$ particle is covered with the silicon (Si) layer. The Si layer may mitigate contact between $CO_2$ and $Li_4SiO_4$ produced within the $SiO_x$ particle. The Si layer may contain substantially no oxygen (O). Therefore, substantially no $Li_4SiO_4$ or the like may be produced in the Si layer. It should be noted that the volume change behavior of Si during charge and discharge may be similar to that of $SiO_x$ during charge and discharge. Therefore, the Si layer may follow the volume change of the $SiO_x$ particle during charge and discharge. As a result, the Si layer may be less likely to have breaks or the like.

As discussed above, a decrease in post-high-temperature-storage capacity retention in the battery according to the present disclosure is expected to be mitigated.

The thickness of the Si layer is not smaller than 10 nm and not greater than 100 nm. The Si layer with a thickness greater than 100 nm may cause a decrease in cycle capacity retention. As the thickness of the Si layer increases, the difference between the volume change of the Si layer and the volume change of the $SiO_x$ particle also increases and thereby the Si layer may be likely to have breaks and/or the like. As for the configuration in which the thickness of the Si layer is smaller than 10 nm, the possibility of mitigation of a decrease in capacity retention is unclear at this point.

[2] The negative electrode active material particle may further contain a carbon layer. The carbon layer may cover a surface of the silicon layer.

In this configuration, improvement in cycle capacity retention and in post-high-temperature-storage capacity retention is expected to be obtained. The reason may be as follows: the carbon layer provides electrical conductivity to the surface of the negative electrode active material particle and thereby mitigates battery degradation.

[3] A method of producing a lithium-ion secondary battery according to the present disclosure includes at least the following (A) to (C):

(A) preparing a negative electrode;
(B) preparing an electrolyte solution; and
(C) producing a lithium-ion secondary battery that includes at least the negative electrode, a positive electrode, and the electrolyte solution.

The negative electrode includes at least negative electrode active material particles. Each of the negative electrode active material particles contains at least a silicon oxide particle and a silicon layer. The silicon layer covers a surface of the silicon oxide particle. The silicon layer has a thickness not smaller than 10 nm and not greater than 100 nm. The electrolyte solution contains at least one selected from the group consisting of fluoroethylene carbonate and vinylene carbonate.

By the method of producing a battery according to [3] above, the battery according to [1] above may be produced.

[4] In the method of producing a battery according to [3] above, the negative electrode active material particle may further contain a carbon layer. The carbon layer may cover a surface of the silicon layer.

By the method of producing a battery according to [4] above, the battery according to [2] above may be produced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The description below does not limit the scope of claims.

<Lithium-Ion Secondary Battery>

Figure 1:
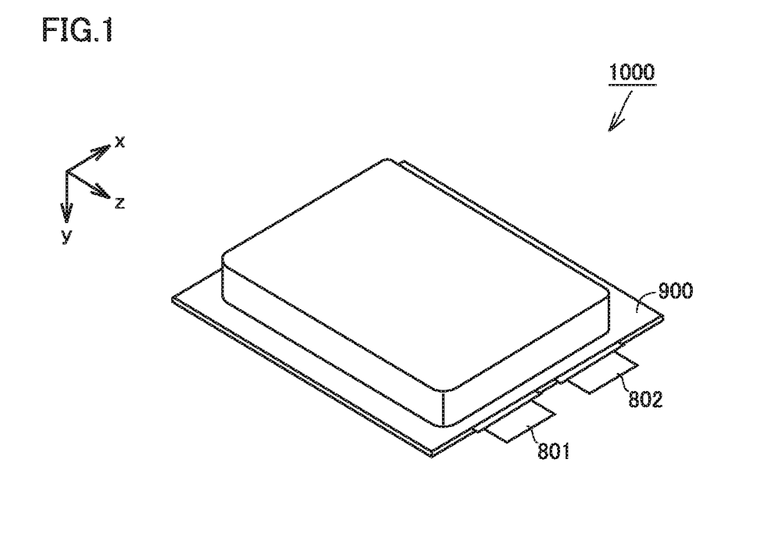
FIG. 1 is a first schematic view illustrating the structure of the lithium-ion secondary battery according to the present embodiment.

FIG. 1 is a first schematic view illustrating the structure of a lithium-ion secondary battery according to the present embodiment.

A battery 1000 includes a casing 900. Casing 900 is a pouch made of an aluminum-laminated film. A negative electrode tab 802 and a positive electrode tab 801 are provided to enable communication between inside and outside casing 900. The edges of casing 900 are heat sealed and thereby casing 900 is hermetically sealed. In other words, battery 1000 is a laminate-type battery. Casing 900 may be made of metal, for example. Battery 1000 may be a prismatic battery or a cylindrical battery, for example. Casing 900 may be equipped with a current interrupt device (CID), a gas-discharge valve, and a liquid inlet, for example.

Figure 2:
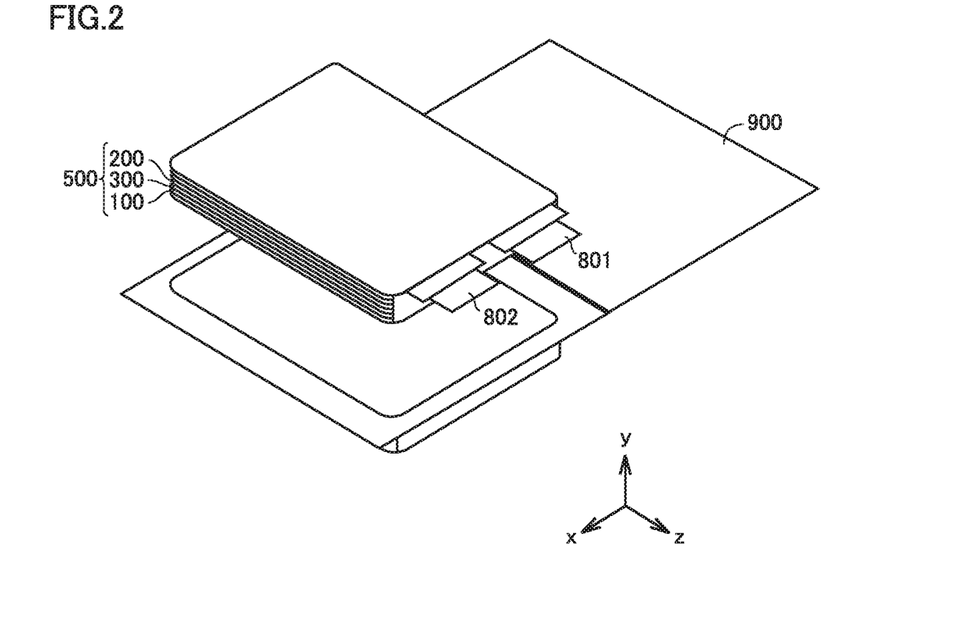
FIG. 2 is a second schematic view illustrating the structure of the lithium-ion secondary battery according to the present embodiment.

FIG. 2 is a second schematic view illustrating the structure of the lithium-ion secondary battery according to the present embodiment.

Casing 900 accommodates an electrode array 500 and an electrolyte solution (not shown). Electrode array 500 is a stack-type one. Electrode array 500 is formed by alternately stacking one negative electrode 200 and one positive electrode 100 and then repeating this alternate stacking process more than once. In other words, battery 1000 includes at least negative electrode 200, positive electrode 100, and the electrolyte solution. In each space between negative electrode 200 and positive electrode 100 in electrode array 500, a separator 300 is interposed. Each negative electrode 200 is electrically connected to negative electrode tab 802. Each positive electrode 100 is electrically connected to positive electrode tab 801.

Electrode array 500 may be a wound-type one, for example. In other words, electrode array 500 may be formed by, for example, stacking positive electrode 100, separator 300, and negative electrode 200 in this order and then winding them in a spiral fashion.

<<Negative Electrode>>

Negative electrode 200 may be in sheet form, for example. Negative electrode 200 may include a negative electrode composite material layer and a negative electrode current collector, for example. The negative electrode current collector may be made of a copper (Cu) foil sheet, for example. The negative electrode current collector may have a thickness not smaller than 5 µm and not greater than 30 µm, for example. The negative electrode composite material layer may be formed on a surface of the negative electrode current collector. The negative electrode composite material layer may have a thickness not smaller than 50 µm and not greater than 200 µm, for example.

<Negative Electrode Active Material Particles>

Figure 3:
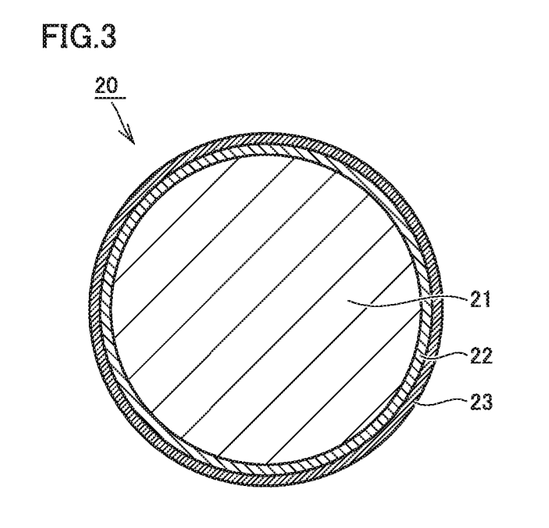
FIG. 3 is a conceptual sectional view illustrating the negative electrode active material particle according to the present embodiment.

FIG. 3 is a conceptual sectional view illustrating a negative electrode active material particle according to the present embodiment.

Negative electrode 200 includes at least negative electrode active material particles 20. Negative electrode active material particles 20 may be contained in the negative electrode composite material layer, for example. Each negative electrode active material particle 20 contains at least a $SiO_x$ particle 21 and a Si layer 22. Each negative electrode active material particle 20 may further contain a C layer 23.

($SiO_x$ Particles)

Each $SiO_x$ particle 21 is a base material of negative electrode active material particle 20. The size of $SiO_x$ particle 21 is not particularly limited. $SiO_x$ particle 21 may have a D50 not lower than 1 µm and not higher than 20 µm, for example. $SiO_x$ particle 21 may have a D50 not lower than 2 µm and not higher than 10 µm, for example. The D50 refers to the particle size in volume-based particle size distribution at which the cumulative particle volume (accumulated from the side of small sizes) reaches 50% of the total particle volume. The D50 may be measured with a laser-diffraction particle size distribution analyzer, for example.

$SiO_x$ particle 21 may substantially consist of $SiO_x$. However, $SiO_x$ particle 21 may contain a trace amount of impurities and the like that are inevitably entrapped during production or other processes. For example, some $SiO_x$ particles 21 may contain $Li_4SiO_4$ or other lithium silicates. For example, some $SiO_x$ particles 21 may contain Si (elementary substance).

$SiO_x$ particles 21 may have a composition represented by, for example, the following compositional formula (I):

$$SiO_x \quad (I)$$

(where x satisfies 0<x<2).

In the above compositional formula (I), x represents the ratio of the concentration of O atoms to the concentration of Si atoms. x may be measured by Auger electron spectrometry, glow discharge mass spectrometry, or inductively coupled plasma atomic emission spectrometry, for example. Measurement of x may be carried out at least three times. The arithmetic mean of these at least three measurements may be used. x may satisfy $0.6 \le x \le 1.5$, for example.

(Si Layer)

Si layer 22 covers a surface of $SiO_x$ particle 21. Desirably, Si layer 22 covers the entire surface of $SiO_x$ particle 21. However, part of the surface of $SiO_x$ particle 21 may be not covered with Si layer 22 as long as a decrease in post-high-temperature-storage capacity retention can be mitigated. In other words, Si layer 22 may cover at least part of the surface of $SiO_x$ particle 21.

Si layer 22 may substantially consist of Si. However, Si layer 22 may contain a trace amount of impurities and the like that are inevitably entrapped during formation of Si layer 22 or other processes. Si layer 22 may mitigate contact between $Li_4SiO_4$ and/or the like that is produced within $SiO_x$ particles 21 and $CO_2$ that is attributable to FEC and/or the like. As a result, a decrease in post-high-temperature-storage capacity retention may be mitigated. Si layer 22 may contain substantially no O. Therefore, substantially no $Li_4SiO_4$ or the like may be produced in Si layer 22.

Si layer 22 has a thickness not smaller than 10 nm and not greater than 100 nm. Si layer 22 with a thickness greater than 100 nm may cause a decrease in cycle capacity retention. As the thickness of Si layer 22 increases, the difference between the volume change of Si layer 22 and the volume change of $SiO_x$ particle 21 also increases and thereby Si layer 22 may be likely to have breaks and/or the like. As for the configuration in which the thickness of Si layer 22 is smaller than 10 nm, the possibility of mitigation of a decrease in capacity retention is unclear at this point. For example, Si layer 22 may have a thickness not smaller than 10 nm and not greater than 50 nm. For example, Si layer 22 may have a thickness not smaller than 50 nm and not greater than 100 nm.

The thickness of Si layer 22 may be measured in, for example, a cross-sectional micrograph of negative electrode active material particle 20 obtained with a transmission electron microscope (TEM). The thickness measurement of Si layer 22 may be carried out at at least three positions per one negative electrode active material particle 20. The arithmetic mean of these at least three thickness measurements may be used. When negative electrode 200 includes a plurality of negative electrode active material particles 20, the thickness measurement of Si layer 22 may be carried out by using at least three negative electrode active material particles 20. The arithmetic mean of these at least three thickness measurements may be used.

(C Layer)

Negative electrode active material particle 20 may further contain C layer 23. C layer 23 covers a surface of Si layer 22. C layer 23 may cover the entire surface of Si layer 22. C layer 23 may cover part of the surface of Si layer 22. In the configuration in which negative electrode active material particle 20 further contains C layer 23, improvement in cycle capacity retention and in post-high-temperature-storage capacity retention is expected to be obtained. The reason may be as follows: C layer 23 provides electrical conductivity to the surface of negative electrode active material particle 20 and thereby mitigates battery degradation.

C layer 23 may substantially consist of carbon. The carbon may be graphitic carbon. The carbon may be amorphous carbon. C layer 23 may be made of a carbon material such as petroleum pitch, coal pitch, charcoal pitch, phenolic resin, and acrylonitrile. The crystallinity of C layer 23 may be adjusted by, for example, heat treatment in an inert atmosphere.

C layer 23 may have a thickness not smaller than 10 nm and not greater than 100 nm, for example. The thickness of C layer 23 may be measured in the same manner as in the thickness measurement of Si layer 22. C layer 23 may have a thickness not smaller than 10 nm and not greater than 50 nm, for example.

<Additional Component>

As long as negative electrode 200 contains negative electrode active material particles 20, negative electrode 200 may further contain an additional component. For example, the negative electrode composite material layer may further contain, for example, negative electrode active material particles other than negative electrode active material particles 20 (hereinafter, the negative electrode active material particles other than negative electrode active material particles 20 are also called "additional negative electrode active material particles"), a conductive material, and a binder.

Examples of the additional negative electrode active material particles include graphite particles, soft carbon particles, hard carbon particles, tin (Sn) particles, SnO particles, Sn-based alloy particles, Si particles, Si-based alloy particles, Li (elementary substance) particles, and Li alloy (such as Li—Al alloy) particles. Negative electrode 200 may contain negative electrode active material particles 20 and graphite, for example. Combining negative electrode active material particles 20 with graphite may lead to improvement in cycle capacity retention. The graphite may be natural graphite. The graphite may be artificial graphite. Negative electrode active material particles 20 and graphite may satisfy, for example, the relationship "(negative electrode active material particles 20):graphite=5:95 to 955 (mass ratio)" Negative electrode active material particles 20 and graphite may satisfy, for example, the relationship "(negative electrode active material particles 20):graphite=5:95 to 30:70 (mass ratio)".

The conductive material may be carbon black (such as acetylene black) and/or carbon short fibers, for example. The content of the conductive material may be, for example, not lower than 1 part by mass and not higher than 10 parts by mass relative to 100 parts by mass of the negative electrode active material. The content (parts by mass) of the negative electrode active material refers to the sum of the content (parts by mass) of negative electrode active material particles 20 and the content (parts by mass) of the additional negative electrode active material particles (the same applies hereinafter). The binder is not particularly limited. The binder may be carboxymethylcellulose (CMC) and/or styrene-butadiene rubber (SBR), for example. The content of the binder may be, for example, not lower than 1 part by mass and not higher than 10 parts by mass relative to 100 parts by mass of the negative electrode active material.

<<Positive Electrode>>

Positive electrode 100 may be in sheet form, for example. Positive electrode 100 includes at least positive electrode active material particles. Positive electrode 100 may include a positive electrode composite material layer and a positive electrode current collector, for example. The positive electrode current collector may be an aluminum (Al) foil sheet, for example. The positive electrode current collector may have a thickness not smaller than 5 μm and not greater than 30 μm, for example. The positive electrode composite material layer may be formed on a surface of the positive electrode current collector. The positive electrode composite material layer may have a thickness not smaller than 50 μm and not greater than 200 μm, for example.

The positive electrode active material particles may be contained in the positive electrode composite material layer, for example. The positive electrode active material particles may have a D50 not lower than 1 μm and not higher than 30 μm, for example. The positive electrode active material particles are not particularly limited. The positive electrode active material particles may be lithium cobalt oxide (LiCoO$_2$) particles, lithium nickel oxide (LiNiO$_2$) particles, lithium manganese oxide (such as LiMnO$_2$ and LiMn$_2$O$_4$) particles, lithium nickel cobalt manganese oxide (such as LiNi$_{1/3}$Co$_{1/3}$Mn$_{1/3}$O$_2$ and LiNi$_{0.5}$Co$_{0.2}$Mn$_{0.3}$O$_2$) particles, lithium nickel cobalt aluminate (such as LiNi$_{0.82}$Co$_{0.15}$Al$_{0.03}$O$_2$) particles, and/or lithium iron phosphate (LiFePO$_4$) particles, for example. Positive electrode 100 may include only one type of the positive electrode active material particles. Positive electrode 100 may include two or more types of the positive electrode active material particles.

The positive electrode composite material layer may further contain a conductive material and a binder, for example. The conductive material is not particularly limited. For example, the conductive material may be a material described above as an example of the conductive material that may be contained in negative electrode 200. The content of the conductive material may be, for example, not lower than 0.1 part by mass and not higher than 10 parts by mass relative to 100 parts by mass of the positive electrode active material particles. The binder is not particularly limited. The binder may be polyvinylidene difluoride (PVdF) and/or (vinylidene fluoride)-hexafluoropropylene copolymer (PVdF-HFP), for example. The content of the binder may be, for example, not lower than 0.1 part by mass and not higher than 10 parts by mass relative to 100 parts by mass of the positive electrode active material particles.

<<Separator>>

Separator 300 is interposed between negative electrode 200 and positive electrode 100. Separator 300 is electrically insulating. Separator 300 separates negative electrode 200 and positive electrode 100 from each other. Separator 300 is a porous film. Separator 300 allows the electrolyte solution to pass therethrough. Separator 300 may have a thickness not smaller than 10 μm and not greater than 30 μm, for example. Separator 300 may be a porous polyolefin film, for example.

Separator 300 may have a monolayer structure. Separator 300 may consist of a porous polyethylene (PE) film, for example. Separator 300 may have a multilayer structure Separator 300 may be formed by, for example, stacking a porous polypropylene (PP) film, a porous PE film, and a porous PP film in this order. Separator 300 may have a heat-resistant film on a surface thereof. The heat-resistant film contains a heat-resistant material. The heat-resistant material may be boehmite, silica, and/or titania, for example.

<<Electrolyte Solution>>

The electrolyte solution according to the present embodiment contains at least a Li salt and a solvent. The electrolyte solution according to the present embodiment further contains at least one selected from the group consisting of FEC and VC. FEC and/or the like may be contained in the electrolyte solution according to the present embodiment as a solvent. FEC and/or the like may be contained in the electrolyte solution according to the present embodiment as an additive. FEC and/or the like may form an SEI film. The SEI film containing FEC and/or the like may lead to improvement in cycle capacity retention.

FEC may be monofluoroethylene carbonate, for example. As long as cycle capacity retention can improve, FEC may also be trans-difluoroethylene carbonate, trifluoroethylene carbonate, tetrafluoroethylene carbonate, and/or the like.

The content of FEC and/or the like in the electrolyte solution may be not lower than 0.1 mass % and not higher than 50 mass %, for example. The content of FEC and/or the like in the electrolyte solution may be not lower than 0.1 mass % and not higher than 10 mass %, for example. The content of FEC and/or the like in the electrolyte solution may be not lower than 0.5 mass % and not higher than 5 mass %, for example. The content of FEC and/or the like in the electrolyte solution may be not lower than 0.5 mass % and not higher than 2 mass %, for example. When both FEC and VC are contained in the electrolyte solution, the content of the FEC and/or the like refers to the sum of the content of the FEC and the content of the VC.

<Solvent>

The solvent is aprotic. The solvent may be a mixture of a cyclic carbonate and a chain carbonate, for example. The mixing ratio may be, for example, "(cyclic carbonate):(chain carbonate)=1:9 to 5:5 (volume ratio)".

The cyclic carbonate may be ethylene carbonate (EC), propylene carbonate (PC), butylene carbonate (BC), FEC, and/or VC, for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

<Li Salt>

The Li salt is a supporting electrolyte. The Li salt is dissolved in the solvent. The concentration of the Li salt may be not lower than 0.5 mol/L and not higher than 2 mol/L (not lower than 0.5M and not higher than 2M), for example. The Li salt may be LiPF$_6$, LiBF$_4$, LiN(FSO$_2$)$_2$, and/or LiN(CF$_3$SO$_2$)$_2$, for example. The electrolyte solution may contain only one type of the Li salt. The electrolyte solution may contain two or more types of the Li salt.

<Additives>

The electrolyte solution may further contain various additives, as needed. Examples of the additives include an SEI-film-forming agent, a gas generation agent (also called "anti-overcharging additive"), and a flame retardant.

The SEI-film-forming agent is a component that promotes SEI film formation. The SEI-film-forming agent may be vinylethylene carbonate (VEC), LiB(C$_2$O$_4$)$_2$, LiPO$_2$F$_2$, propane sultone (PS), and/or ethylene sulfite (ES), for example.

The gas generation agent is a component that promotes gas generation at the time of overcharging. The generated gas may promote activation of, for example, a CID. The gas generation agent may be cyclohexylbenzene (CHB) and/or biphenyl (BP), for example. The flame retardant is a component that gives flame retardancy to the electrolyte solution. The flame retardant may be a phosphoric acid ester and/or a phosphazene, for example.

The content of the additives may be not lower than 0.1 mass % and not higher than 5 mass %, for example. When the electrolyte solution contains two or more types of the additives, the content of the additives refers to the total content of all the additives contained.

<Method of Producing Lithium-Ion Secondary Battery>

Next, the method of producing a lithium-ion secondary battery according to the present embodiment is described.

Figure 4:
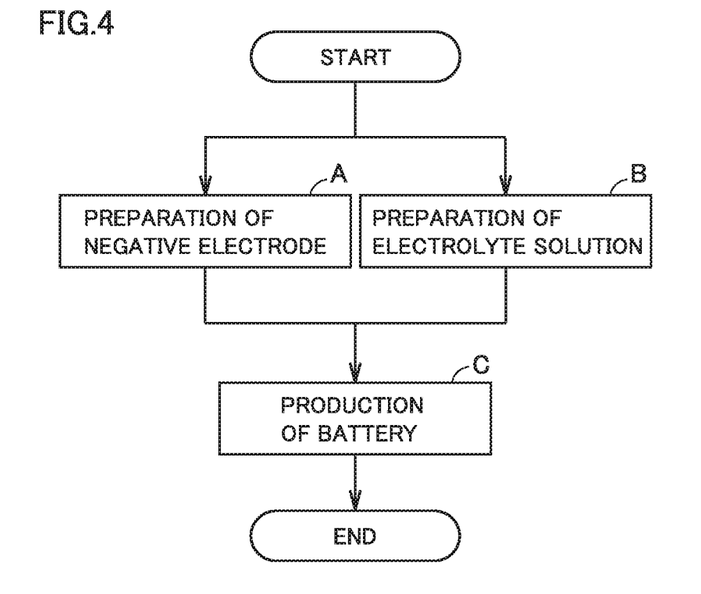
FIG. 4 is a flow chart schematically illustrating the method of producing a lithium-ion secondary battery according to the present embodiment.

FIG. 4 is a flow chart schematically illustrating the method of producing a lithium-ion secondary battery according to the present embodiment. The method of producing a battery according to the present embodiment includes at least "(A) preparation of a negative electrode", "(B) preparation of an electrolyte solution", and "(C) production of a battery".

<<Preparation of Negative Electrode>>

The method of producing a battery according to the present embodiment includes preparing negative electrode 200. Negative electrode 200 is described above in detail. More specifically, negative electrode 200 includes at least negative electrode active material particles 20.

Negative electrode active material particles 20 may be prepared by, for example, a method described below. $SiO_x$ particles 21 are prepared as a base material. $SiO_x$ particles 21 are described above in detail. Preparation of $SiO_x$ particles 21 may be carried out by purchasing a commercial equivalent for $SiO_x$ particles 21 or by synthesizing $SiO_x$ particles 21.

Then, each $SiO_x$ particle 21 is covered with Si. Thus, Si layer 22 is formed. The method of forming Si layer 22 is not particularly limited. For example, formation of Si layer 22 may be carried out by barrel sputtering. By barrel sputtering, the entire surface of $SiO_x$ particle 21 is expected to be uniformly covered. Si layer 22 is formed to have a thickness not smaller than 10 nm and not greater than 100 nm. The thickness of Si layer 22 may be adjusted by changing, for example, sputtering duration.

On a surface of Si layer 22, C layer 23 may be further formed as needed. The method of forming C layer 23 is not particularly limited. An example method is described below. Negative electrode active material particle 20 having Si layer 22 formed thereon is mixed with a carbon material to prepare a mixture. The carbon material may be petroleum pitch, for example. The resulting mixture is heated in an inert atmosphere at a temperature of about 500 to 1000° C. The inert atmosphere may be a nitrogen atmosphere, for example. In this way, C layer 23 may be formed. After C layer 23 is thus formed, the mixture may be pulverized and thereby negative electrode active material particle 20 containing both Si layer 22 and C layer 23 may be formed.

For example, negative electrode active material particles 20, a binder, and a solvent may be mixed and thereby a negative-electrode-forming coating material may be prepared. In the mixing process, a typical stirrer or the like may be used. To the negative-electrode-forming coating material, additional negative electrode active material particles, a conductive material, and/or the like may further be mixed as needed. As the solvent, a solvent suitable for the type of the binder is selected. In the configuration in which the binder is a combination of CMC and SBR, for example, the solvent may be water.

A negative electrode current collector is prepared. The negative electrode current collector is described above in detail. To a surface of the negative electrode current collector, the negative-electrode-forming coating material may be applied, followed by drying to form a negative electrode composite material layer. In the application process, a typical applicator or the like may be used. In the drying process, a typical dryer may be used. After the drying, the resulting negative electrode composite material layer may be compressed with, for example, a rolling mill. In this way, negative electrode 200 may be prepared.

<<(B) Preparation of Electrolyte Solution>>

The method of producing a battery according to the present embodiment includes preparing an electrolyte solution. The electrolyte solution is described above in detail. In the present embodiment, an electrolyte solution containing FEC and/or the like is prepared. When the electrolyte solution at the stage of its preparation (namely, at the stage before injected into casing 900) contains FEC and/or the like, the resulting battery 1000 is regarded as a battery that includes FEC and/or the like in the electrolyte solution.

<<(C) Production of Battery>>

The method of producing a battery according to the present embodiment includes producing battery 1000 that includes at least negative electrode 200, positive electrode 100, and the electrolyte solution.

Positive electrode 100 is prepared. Positive electrode 100 is described above in detail. Positive electrode 100 may be prepared by a conventionally known method. An example method is described below. Positive electrode active material particles, a conductive material, a binder, and a solvent may be mixed and thereby a positive-electrode-forming coating material may be prepared. The resulting positive-electrode-forming coating material may be applied to a surface of a positive electrode current collector and then dried to prepare positive electrode 100.

Electrode array 500 is formed. Electrode array 500 is formed by, for example, alternately stacking one negative electrode 200 and one positive electrode 100 and then repeating this alternate stacking process more than once. In each space between negative electrode 200 and positive electrode 100, separator 300 is interposed. Separator 300 is described above in detail. To electrode array 500, negative electrode tab 802 and positive electrode tab 801 are attached.

Casing 900 is prepared. Casing 900 is described above in detail. In casing 900, electrode array 500 is placed. Into casing 900, the electrolyte solution is injected. Casing 900 is hermetically sealed. In this way, battery 1000 may be produced.

EXAMPLES

Next, examples according to the present disclosure are described. The description below does not limit the scope of claims.

Example 1

<<(A) Preparation of Negative Electrode>>

1. Preparation of Negative Electrode Active Material Particles

As $SiO_x$ particles 21, SiO particles were prepared. The SiO particles had a composition represented by the above compositional formula (I) in which x=1. $SiO_x$ particles 21 had a D50 of about 30 μm. SiO$_x$ particles 21 were pulverized in a jet mill. After pulverization, SiO$_x$ particles 21 were classified. Thus, the D50 of SiO$_x$ particles 21 was adjusted to 10 μm.

A barrel-based DC-RF magnetron sputtering apparatus was prepared. This sputtering apparatus is designed for powder materials Into the barrel, SiO$_x$ particles 21 were loaded. Si targets were loaded. Sputtering was carried out and thereby Si layer 22 was formed on a surface of each SiO$_x$ particle 21. In other words, a surface of SiO$_x$ particle 21 was covered with Si layer 22. Thus, negative electrode active material particles 20 were prepared. The sputtering conditions were described below.

<Sputtering Conditions>
RF power: 200 W
Sputtering duration: five hours
Partial pressure of argon within barrel: 1 to 1.5 Pa In Example 1, the thickness of Si layer 22 may be 50 nm. In the examples according to the present disclosure, the thickness of Si layer 22 was estimated in the manner described below.

A 0.5 cm square Si wafer was prepared. To part of the Si wafer, a piece of tape was attached. The resulting tape-attached Si wafer, together with SiO$_x$ particles 21, were loaded into the barrel. Sputtering was carried out, and thereby Si was deposited on the tape-attached Si wafer as well. After sputtering, the tape was removed from the Si wafer. The resulting Si wafer was rinsed in, for example, acetone. The level difference between the part covered with the tape during sputtering and the part exposed during sputtering was measured. The level difference measurement was carried out with, for example, an atomic force microscope (AFM). The level difference thus measured is considered substantially equal to the thickness of Si layer 22.

2. Preparation of Negative Electrode

The materials described below were prepared.

Negative electrode active material particles 20: negative electrode active material particles 20 prepared in the above-described manner Additional negative electrode active material particles: graphite (spheronized natural graphite with a D50 of 15.5 μm)

Conductive material: acetylene black (AB)
Binder: CMC and SBR
Solvent: water
Negative electrode current collector: Cu foil sheet (thickness, 10 μm)

Negative electrode active material particles 20, graphite, AB, CMC, SBR, and water were mixed, and thus a negative-electrode-forming coating material was prepared. The mixing ratio was "(negative electrode active material particles 20):graphite:AB:SBR=85:10:3:1:1 (mass ratio)". The resulting negative-electrode-forming coating material was applied to a surface of the negative electrode current collector with an applicator. The negative-electrode-forming coating material was dried with a hot-air dryer. The drying was continued for 10 minutes. Thus, a negative electrode composite material layer was formed. The resulting negative electrode composite material layer was compressed with a rolling mill. The compressed negative electrode composite material layer had a thickness of 60 μm. Thus, a negative electrode raw sheet was prepared. The resulting negative electrode raw sheet was cut, and thus negative electrode 200 was prepared. Negative electrode 200 had planar dimensions of 30 mm in length and 30 mm in width.

<<(B) Preparation of Electrolyte Solution>>

An electrolyte solution containing the components listed below was prepared.

<Electrolyte Solution>
Solvent: [EC:EMC=1:3 (volume ratio)]
Li salt: LiPF$_6$ (concentration, 1 mol/L)
FEC: 1 mass %

<<(C) Production of Battery>>

Positive electrode 100 was prepared. Positive electrode 100 had a structure described below.

<Structure of Positive Electrode>
Positive electrode active material: LiNi$_{0.5}$Co$_{0.2}$Mn$_{0.3}$O$_2$
Conductive material: AB
Binder: PVdF
Mixing ratio: [(positive electrode active material):(conductive material):binder=95:2:3 (mass ratio)]
Positive electrode current collector: Al foil sheet (thickness, 15 μm)
Positive electrode composite material layer: thickness=80 μm
Planar dimensions: 30 mm in length and 30 mm in width Separator 300 was prepared. Separator 300 had a thickness of 20 μm. Separator 300 had a three-layer structure. More specifically, separator 300 was formed by stacking a porous PP film, a porous PE film, and a porous PP film in this order.

Negative electrode 200, separator 300, and positive electrode 100 were stacked in such a way that negative electrode 200 and positive electrode 100 faced each other with separator 300 interposed therebetween. Thus, electrode array 500 was formed. Casing 900 was prepared. Casing 900 was a pouch made of an aluminum-laminated film. In casing 900, electrode array 500 was placed. Into casing 900, 1 g of the electrolyte solution was injected. Casing 900 was hermetically sealed. In this way, battery 1000 (lithium-ion secondary battery) was produced. Battery 1000 was a laminate-type battery.

Battery 1000 was connected to a charge-discharge tester. Battery 1000 was charged to 4.2 V at a constant current of 0.15 mA. Battery 1000 was rested for 15 minutes and then discharged to 2.5 V at a constant current of 0.15 mA. Thus, the initial discharged capacity was measured. In the examples according to the present disclosure, battery 1000 was designed to have a initial discharged capacity of about 45 to 47 mAh.

Example 2

Battery 1000 was produced in the same manner as in Example 1 except that the electrolyte solution contained 1 mass % VC instead of 1 mass % FEC.

Example 3

Negative electrode active material particles 20 were prepared in the same manner as in Example 1 except that the sputtering duration was changed to one hour. Then, battery 1000 was produced. The thickness of Si layer 22 was estimated at 10 nm.

Example 4

Negative electrode active material particles 20 were prepared in the same manner as in Example 1 except that the sputtering duration was changed to 15 hours. Then, battery 1000 was produced. The thickness of Si layer 22 was estimated at 100 nm.

Example 5

Negative electrode active material particles 20 prepared in Example 1 were mixed with petroleum pitch. Thus, a mixture was prepared. The resulting mixture was heated under nitrogen flow. The upper limit to the temperature during the heating was 1000° C. Thus, C layer 23 was formed on a surface of Si layer 22. In other words, a surface of Si layer 22 was covered with C layer 23. After heating, the mixture was pulverized in a ball mill. Thus, negative electrode active material particles 20 were prepared. As a result of the formation of C layer 23, the mass of negative electrode active material particles 20 increased by about 2%. The thickness of C layer 23 was estimated at 30 nm. Except these conditions, the same manner as in Example 1 was adopted to produce battery 1000.

Comparative Example 1

In Comparative Example 1, $SiO_x$ particles 21 with no further treatment were used as negative electrode active material particles 20. The electrolyte solution used in Comparative Example 1 did not contain FEC or VC. Except these conditions, the same manner as in Example 1 was adopted to produce battery 1000.

Comparative Example 2

Battery 1000 was produced in the same manner as in Example 1 except that $SiO_x$ particles 21 with no further treatment were used as negative electrode active material particles 20.

Comparative Example 3

Battery 1000 was produced in the same manner as in Example 2 except that $SiO_x$ particles 21 with no further treatment were used as negative electrode active material particles 20.

Comparative Example 4

Battery 1000 was produced in the same manner as in Example 1 except that the electrolyte solution did not contain FEC or VC.

Comparative Example 5

Negative electrode active material particles 20 were prepared in the same manner as in Example 1 except that the sputtering duration was changed to 40 hours. Then, battery 1000 was produced. The thickness of Si layer 22 was estimated at 150 nm.

Comparative Example 6

Negative electrode active material particles 20 were prepared in the same manner as in Example 5 except that C layer 23 was formed directly on a surface of $SiO_x$ particle 21 without Si layer 22 interposed therebetween. Then, battery 1000 was produced. The thickness of C layer 23 was estimated at 30 nm.

<Evaluation>

1. Cycle Test 50 cycles of charge and discharge were carried out in an environment at room temperature. A single cycle consisted of a sequence of "charge→rest→discharge→rest", which is described below. The discharged capacity measured after the 50th cycle was divided by the initial capacity, and thus the cycle capacity retention was calculated. Results are shown in Table 1 below.

Charge: constant-current-constant-voltage mode (current during constant-current charge=15 mA, cutoff current=0.15 mA)

Rest: 10 minutes

Discharge: constant-current-constant-voltage mode (current during constant-current discharge=15 mA, cutoff current=0.15 mA)

Rest: 10 minutes

2. High Temperature Storage Test

By the constant-current-constant-voltage charge, battery 1000 was charged to 4.25 V. The current during the constant-current charge was 15 mA. The cutoff current was 0.15 mA. Battery 1000 thus charged was then stored for 30 days in an environment at a temperature of 60° C.

After storage, battery 1000 was discharged in the constant-current-constant-voltage mode. The current during the constant-current discharge was 15 mA. The cutoff current was 0.15 mA.

Battery 1000 thus discharged was charged to 4.2 V in the constant-current-constant-voltage mode. The current during the constant-current charge was 15 mA. The cutoff current was 0.15 mA. After ten minutes of resting, battery 1000 was discharged to 2.5 V in the constant-current-constant-voltage mode. The current during the constant-current discharge was 15 mA. The cutoff current was 0.15 mA. Thus, post-high-temperature-storage discharged capacity was measured. The resulting post-high-temperature-storage discharged capacity was divided by the initial discharged capacity, and thus post-high-temperature-storage capacity retention was calculated. Results are shown in Table 1 below.

TABLE 1

| | Negative electrode active material particles | | | Electrolyte solution | | Evaluation | |
|---|---|---|---|---|---|---|---|
| | $SiO_x$ particles $SiO_x$ | Si layer [nm] | C layer [nm] | FEC [mass %] | VC [mass %] | Cycle capacity retention [%] | Post-high-temperature-storage capacity retention [%] |
| Comp. Ex. 1 | x = 1 | — | — | 0 | 0 | 69.7 | 86.7 |
| Comp. Ex. 2 | x = 1 | — | — | 1 | 0 | 73.6 | 78.3 |
| Comp. Ex. 3 | x = 1 | — | — | 0 | 1 | 71.3 | 80.9 |
| Comp. Ex. 4 | x = 1 | 50 | — | 0 | 0 | 70.5 | 87.2 |
| Ex. 1 | x = 1 | 50 | — | 1 | 0 | 73.9 | 86.5 |
| Ex. 2 | x = 1 | 50 | — | 0 | 1 | 71.8 | 87.0 |

TABLE 1-continued

| | Negative electrode Negative electrode active material particles | | | Electrolyte solution | | Evaluation | |
|---|---|---|---|---|---|---|---|
| | | | | | | Cycle | Post-high- |
| | $SiO_x$ | Si | C | | | capacity | temperature-storage |
| | particles $SiO_x$ | layer [nm] | layer [nm] | FEC [mass %] | VC [mass %] | retention [%] | capacity retention [%] |
| Ex. 3 | x = 1 | 10 | — | 1 | 0 | 73.4 | 85.4 |
| Ex. 4 | x = 1 | 100 | — | 1 | 0 | 73.9 | 86.7 |
| Ex. 5 | x = 1 | 50 | 30 | 1 | 0 | 78.1 | 88.6 |
| Comp. Ex. 5 | x = 1 | 150 | — | 1 | 0 | 64.1 | 85.2 |
| Comp. Ex. 6 | x = 1 | — | 30 | 1 | 0 | 77.2 | 81.2 |

<Results>

Results of Comparative Examples 1 to 3 illustrate the following tendency: when the electrolyte solution contains FEC and/or the like, cycle capacity retention improves but post-high-temperature-storage capacity retention decreases.

Results of Comparative Examples 2 and 3 and Examples 1 and 2 illustrate the following tendency: when a surface of $SiO_x$ particle 21 is covered with Si layer 22, a decrease in post-high-temperature-storage capacity retention is mitigated.

Results of Comparative Examples 1 and 4 suggest that when the electrolyte solution does not contain FEC or the like, covering a surface of $SiO_x$ particle 21 with Si layer 22 may cause no significant change in cycle capacity retention or in post-high-temperature-storage capacity retention.

Results of Examples 1, 3, and 4 and Comparative Example 5 illustrate the following tendency: Si layer 22 with a thickness greater than 100 nm causes a decrease in cycle capacity retention. As the thickness of Si layer 22 increases, the difference between the volume change of Si layer 22 and the volume change of $SiO_x$ particles 21 also increases and thereby Si layer 22 may be likely to have breaks and/or the like.

Results of Comparative Example 6 illustrate the following tendency: when a surface of $SiO_x$ particle 21 is covered directly with C layer 23, improvement in cycle capacity retention is obtained but mitigation of a decrease in post-high-temperature-storage capacity retention may be insufficient. The volume change behavior of C (carbon) during charge and discharge may be significantly different from that of $SiO_x$ during charge and discharge, and therefore C layer 23 may not likely to follow the volume change of $SiO_x$ particle. As a result, C layer 23 may have breaks and/or the like and $SiO_x$ particles may be exposed. The exposure of $SiO_x$ particles may cause reaction between $Li_4SiO_4$ and $CO_2$.

Results of Examples 1 and 5 illustrate the following tendency: when C layer 23 is further formed on a surface of Si layer 22, cycle capacity retention and post-high-temperature-storage capacity retention improve. The reason may be as follows: C layer 23 provides electrical conductivity to surfaces of negative electrode active material particles 20 and thereby mitigates battery degradation.

The embodiments and examples disclosed herein are illustrative and non-restrictive in any respect. The technical scope indicated by the claims is intended to include any modifications within the scope and meaning equivalent to the terms of the claims.

What is claimed is:

1. A lithium-ion secondary battery comprising at least:
   a negative electrode;
   a positive electrode; and
   an electrolyte solution,
   the negative electrode comprising at least negative electrode active material particles,
   each of the negative electrode active material particles containing at least a silicon oxide particle and a silicon layer,
   the silicon layer covering a surface of the silicon oxide particle,
   the silicon layer having a thickness not smaller than 10 nm and not greater than 100 nm,
   the electrolyte solution containing at least one selected from the group consisting of fluoroethylene carbonate and vinylene carbonate, and
   the silicon oxide particles having a particle size D50 not smaller than 1 μm and not higher than 20 μm.

2. The lithium-ion secondary battery according to claim 1, wherein
   the negative electrode active material particle further contains a carbon layer, and the carbon layer covers a surface of the silicon layer.

3. The lithium-ion secondary battery according to claim 1, wherein
   a content of the at least one selected from the group consisting of fluoroethylene carbonate and vinylene carbonate is not smaller than 0.1 mass % and not higher than 50 mass % when a total mass of the electrolyte solution is considered to be 100 mass %.

4. The lithium-ion secondary battery according to claim 1, wherein
   a content of the at least one selected from the group consisting of fluoroethylene carbonate and vinylene carbonate is not smaller than 0.5 mass % and not higher than 2 mass % when a total mass of the electrolyte solution is considered to be 100 mass %.

5. The lithium-ion secondary battery according to claim 1, wherein
   the particle size D50 of the silicon oxide particles is not smaller than 2 μm and not higher than 10 μm.

6. The lithium-ion secondary battery according to claim 1, wherein
   the electrolyte solution further comprises a mixture of a cyclic carbonate solvent and a chain carbonate solvent in a mixing ratio of the cyclic carbonate solvent to the chain carbonate solvent of 1:9 to 5:5 by volume.

7. The lithium-ion secondary battery according to claim 1, wherein
   a content of the at least one selected from the group consisting of fluoroethylene carbonate and vinylene carbonate is not smaller than 0.5 mass % and not higher than 2 mass % when a total mass of the electrolyte solution is considered to be 100 mass %;

the particle size D50 of the silicon oxide particles is not smaller than 2 μm and not higher than 10 μm; and the electrolyte solution further comprises a mixture of a cyclic carbonate solvent and a chain carbonate solvent in a mixing ratio of the cyclic carbonate solvent to the chain carbonate solvent of 1:9 to 5:5 by volume.

8. A method of producing a lithium-ion secondary battery, the method comprising at least:

preparing a negative electrode;

preparing an electrolyte solution; and producing a lithium-ion secondary battery that includes at least the negative electrode, a positive electrode, and the electrolyte solution, the negative electrode comprising at least negative electrode active material particles, each of the negative electrode active material particles containing at least a silicon oxide particle and a silicon layer, the silicon layer covering a surface of the silicon oxide particle, the silicon layer having a thickness not smaller than 10 nm and not greater than 100 nm, the electrolyte solution containing at least one selected from the group consisting of fluoroethylene carbonate and vinylene carbonate, and the silicon oxide particles having a particle size D50 not smaller than 1 μm and not higher than 20 μm.

9. The method of producing a lithium-ion secondary battery according to claim 8, wherein the negative electrode active material particle further contains a carbon layer, and the carbon layer covers a surface of the silicon layer.

10. The method of producing a lithium-ion secondary battery according to claim 8, wherein a content of the at least one selected from the group consisting of fluoroethylene carbonate and vinylene carbonate is not smaller than 0.1 mass % and not higher than 50 mass % when a total mass of the electrolyte solution is considered to be 100 mass %.

11. The method of producing a lithium-ion secondary battery according to claim 8, wherein a content of the at least one selected from the group consisting of fluoroethylene carbonate and vinylene carbonate is not smaller than 0.5 mass % and not higher than 2 mass % when a total mass of the electrolyte solution is considered to be 100 mass %.

12. The method of producing a lithium-ion secondary battery according to claim 8, wherein the particle size D50 of the silicon oxide particles is not smaller than 2 μm and not higher than 10 μm.

13. The method of producing a lithium-ion secondary battery according to claim 8, wherein the electrolyte solution further comprises a mixture of a cyclic carbonate solvent and a chain carbonate solvent in a mixing ratio of the cyclic carbonate solvent to the chain carbonate solvent of 1:9 to 5:5 by volume.

14. The method of producing a lithium-ion secondary battery according to claim 8, wherein a content of the at least one selected from the group consisting of fluoroethylene carbonate and vinylene carbonate is not smaller than 0.5 mass % and not higher than 2 mass % when a total mass of the electrolyte solution is considered to be 100 mass %;

the particle size D50 of the silicon oxide particles is not smaller than 2 μm and not higher than 10 μm; and the electrolyte solution further comprises a mixture of a cyclic carbonate solvent and a chain carbonate solvent in a mixing ratio of the cyclic carbonate solvent to the chain carbonate solvent of 1:9 to 5:5 by volume.

\* \* \* \* \*